(No Model.)
C. H. GOODSELL.
VELOCIPEDE.
No. 384,150. Patented June 5, 1888.
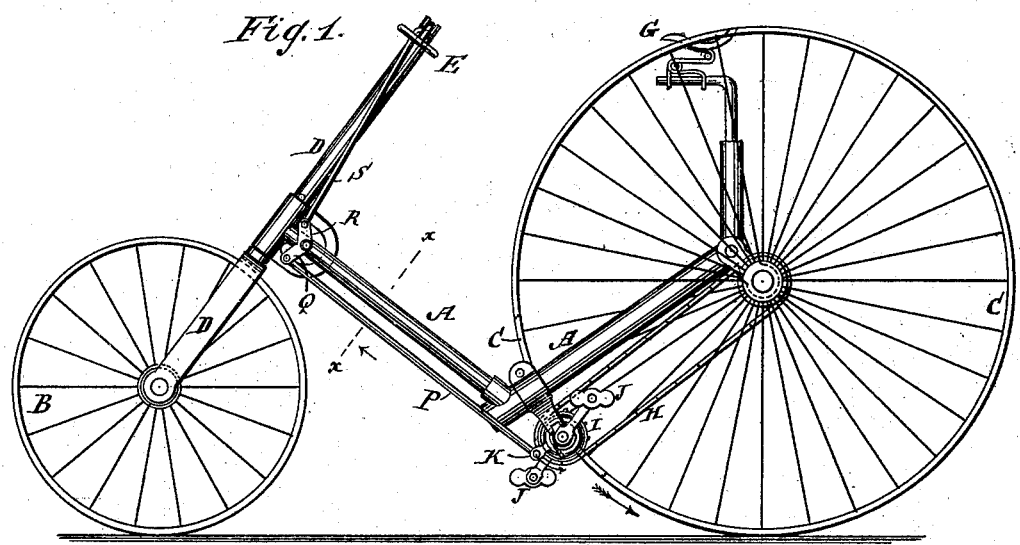
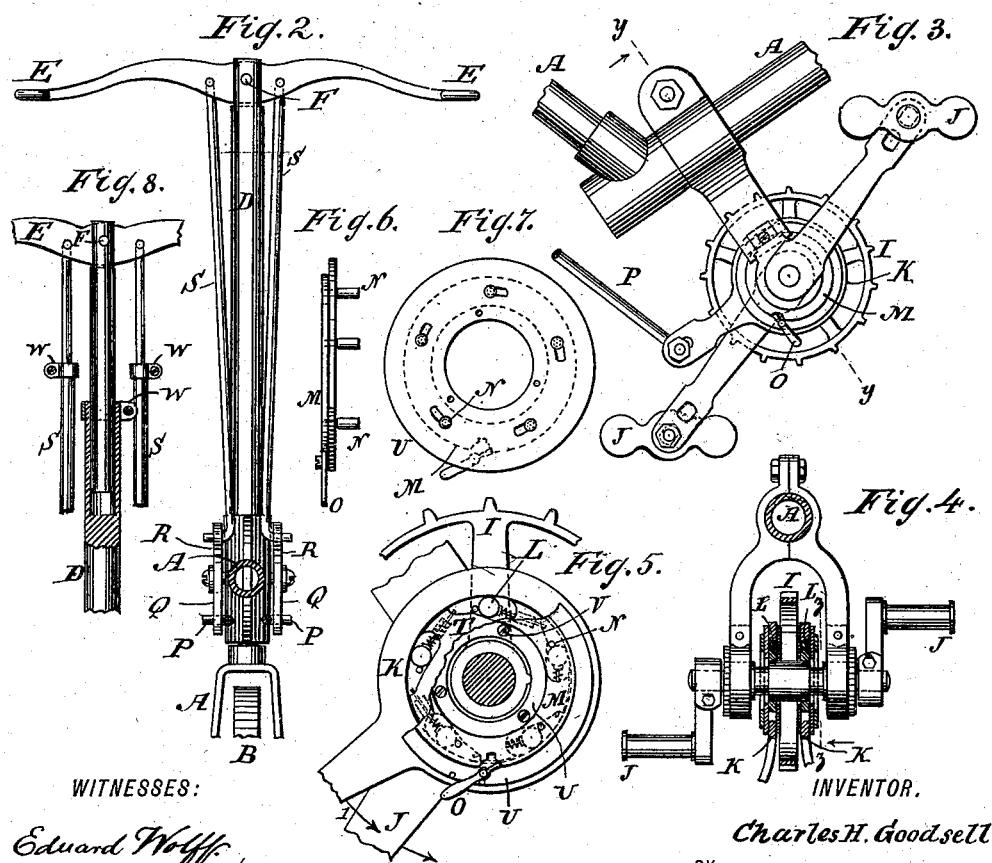
WITNESSES:
Eduard Wolff
William Miller
INVENTOR.
Charles H. Goodsell.
BY
Van Santvoord & Hauff,
his ATTORNEYS.

UNITED STATES PATENT OFFICE.

CHARLES H. GOODSELL, OF POUGHKEEPSIE, NEW YORK.

VELOCIPEDE.

SPECIFICATION forming part of Letters Patent No. 384,150, dated June 5, 1888.

Application filed January 20, 1888. Serial No. 261,355. (No model.)

*To all whom it may concern:*

Be it known that I, CHARLES H. GOODSELL, a citizen of the United States, residing at Poughkeepsie, in the county of Dutchess and State of New York, have invented new and useful Improvements in Velocipedes, of which the following is a specification.

This invention relates to improvements in velocipedes, whereby the velocipede can be readily operated, as set forth in the following specification and claims, and illustrated in the accompanying drawings, in which—

Figure 1 is a side elevation of a velocipede. Fig. 2 is a section in the plane $x\ x$, Fig. 1, on a larger scale than Fig. 1. Fig. 3 is a detail view of actuating mechanism for a driving-wheel. Fig. 4 is a section in the plane $y\ y$, Fig. 3. Fig. 5 is a section in the plane $z\ z$, Fig. 4. Fig. 6 is a detail side view of releasing mechanism for the clutch. Fig. 7 is a rear view of releasing mechanism for the clutch. Fig. 8 is a detail front view of a modification.

Similar letters indicate corresponding parts.

In the drawings, the letter A indicates a backbone or frame having a steering-wheel, B, and a driving-wheel, C. Two driving-wheels, C, one on each side of the vehicle, may be applied, and one or both of said wheels C may be made to act as a driving-wheel. The steering-wheel B is mounted in a frame or support, D, adapted to swivel or rotate, so as to make the wheel B guide the device. A handle, E, is adapted to enable the frame D to be swiveled or turned. Said handle can thus act as a steering-bar. Said handle E is adapted to be oscillated about the pivot F, as will be hereinafter set forth.

The seat G for the driver is placed so as to allow ready grasping of the handle E, and the feet of the driver are used to work the treadles J. About the driving-wheel, or about its hub or axle, is led a belt or chain, H, which passes about a pulley, I, to which pulley the treadles J are connected. The treadles can thus be actuated to turn the pulley I and the driving-wheel C.

To the pulley I are connected one or more friction-clutches. The friction-clutches are shown as being formed of rollers L, placed between a ring, K, and inclined shoulders T on the hub of the pulley I. When the rollers L are jammed into the narrow space between the ring K and shoulders T by the ring K being turned in the direction of arrow 1, Fig. 5, the ring K and shoulders T will be locked together, so that the shoulders T and the pulley I rotate with the ring K. The wheel C is thus rotated to move the velocipede forward. When the ring K swings in the direction opposed to said arrow 1, the rollers L pass to the wide space between the ring K and shoulders T, so that the motion of the ring K in said last-named direction will not be imparted to the pulley I. By thus oscillating the ring K back and forth the pulley I will be rotated, so as to actuate the wheel C to drive the velocipede forward.

A releasing mechanism is provided for releasing the clutch from the pulley I. This releasing mechanism is shown as consisting of a plate or disk, M, carrying studs N. The studs N pass through slots in a disk or plate, U, and shoulders on the studs N prevent the studs passing out of the slots in the plate U. The slots in the plate U allow the plate M and studs N to be moved a certain distance. A lever, O, on the plate U, enables the plate M to be moved back and forth. Screws V hold the plate U in place. When the lever O is in the position shown in Fig. 5, the rollers L are free to lock the ring K and shoulders T together at proper moments. By swinging the lever O to the position shown in Fig. 3 the plate M will be turned, so that the studs N will press the rollers L into the larger space between the ring K and the shoulders T, and will hold said rollers in said larger space, so that said rollers cannot lock the ring K and the pulley I together.

To the ring K is attached a rod or connection, P, jointed to a bell-crank lever, Q R. A rod or connection, S, is jointed to the bell-crank lever Q R and to the handle E. When the clutch is in position to grip the pulley I, the handle E when oscillated about the pivot F will, through the oscillations which said handle imparts to the ring K, cause the pulley I to be rotated, so as to actuate the wheel C.

In the drawings are shown two clutches, each linked or connected to the handle E so as to receive motion from said handle. When the treadles J are used to actuate the wheel C, the pulley I can be released from the clutches, while when the pulley I is not released from the clutches the handle E can be used to rotate the pulley I, or both the handle E and treadles J can be used to rotate the pulley I.

In the modification shown in Fig. 8 the frame D and connections S are each shown as consisting of two sections or parts, one of which is adapted to slide or telescope into or out of the other section. The handle E can thus be adjusted so as to bring said handle into different relative positions to the seat G, as may be required to suit the operator. When the handle E has been adjusted to its proper position, the clamps W, which may be of any suitable construction, are tightened, so as to secure the various sections of the frame D and connections S against improper movement.

It is obvious that the rod P, instead of connecting with the clutch below the axis or point of oscillation of the clutch, may connect with said clutch above its axis or point of oscillation.

I do not herein broadly claim what is shown, described, and claimed in my Letters Patent No. 377,610, dated February 7, 1888.

What I claim as new, and desire to secure by Letters Patent, is—

1. In a velocipede, the combination, with a backbone or frame, a driving-wheel, and a steering-wheel, of a steering-bar centrally pivoted to the frame of the steering-wheel, a pulley connected to the driving-wheel and having a friction-clutch, and a connection between the pivoted steering-bar and the clutch, substantially as set forth.

2. The combination, with a backbone or frame and a steering and driving wheel, of friction-clutches on the shaft of the driving-pulley, a steering-bar centrally pivoted to the frame, and links connecting said steering-bar to the friction-clutches, substantially as set forth.

3. The combination, with a backbone or frame and a steering and driving wheel, of a friction-clutch connected to said driving-wheel and an actuating-handle and releasing mechanism connected to said friction-clutch, substantially as set forth.

4. The combination, with a backbone or frame, a steering and driving wheel, and a friction-clutch connected to said driving-wheel, of an actuating handle and a bell-crank lever connected to said handle and to said friction-clutch, substantially as set forth.

5. The combination, with a backbone or frame, and with a driving and steering wheel, of friction-clutches on the shaft of the driving-pulley, bell-cranks mounted on the frame and connected to said friction-clutches, links connected to the bell-cranks, and a steering-bar centrally mounted to oscillate on the frame and connected to said links, substantially as shown and set forth.

6. In a velocipede, the combination, with a backbone or frame, a driving-wheel, and a steering-wheel, of an actuating-handle and an adjustable connection between said handle and the driving-wheel, substantially as set forth.

7. In a velocipede, the combination, with a backbone or frame, a steering-wheel, and a driving-wheel, of an actuating-handle adjustably mounted on the vehicle and adjustably connected to the driving-wheel, substantially as set forth.

8. The combination, with a backbone or frame, and with a steering and driving wheel, of an actuating-handle, a clutch provided with gripping-rollers L, and made to connect with said actuating-handle and driving-wheel, and releasing-studs N, for holding said rollers L in their releasing position, substantially as set forth.

9. The combination, with the backbone, driving-wheel, and steering-wheel of a velocipede, of a pulley, I, connected with the driving-wheel, a friction-clutch comprising a rotary ring, K, and gripping-rollers L between the ring and a hub on the pulley, a centrally-pivoted steering-bar, E, and connections between said bar and rotary ring, substantially as described.

10. The combination, with the wheel C, treadles J, and the pulley I, connected with said wheel and treadles and having a hub provided with inclined shoulders T, of the rotary ring K, the rollers L, located between said ring and the pulley-hub, the slotted disk U, and the ring M, having pins N extending through the slotted disk, substantially as described.

11. The combination, with a backbone or frame, and with a driving and steering wheel, of clutches on the shaft of the driving-pulley, bell-cranks mounted on the frame and connected to said clutches, links connected to the bell-cranks, and a steering-bar centrally mounted to oscillate on the frame and connected to said links, a lever, O, being applied to said clutches to release said clutches, substantially as set forth.

In testimony whereof I have hereunto set my hand and seal in the presence of two subscribing witnesses.

CHARLES H. GOODSELL. [L. S.]

Witnesses:
W. C. HAUFF,
E. F. KASTENHUBER.